US012669992B2

(12) United States Patent
Duma et al.

(10) Patent No.: US 12,669,992 B2
(45) Date of Patent: Jun. 30, 2026

(54) SYSTEM AND METHOD FOR DETERMINING POTENTIAL ISSUES WITH A SOFTWARE DEPLOYMENT

(71) Applicant: FIDELITY INFORMATION SERVICES, LLC, Jacksonville, FL (US)

(72) Inventors: Gary B. Duma, Royal Oak, MI (US); Sheel Saket, Warrenville, IL (US)

(73) Assignee: Fidelity Information Services, LLC, Jacksonville, FL (US)

( * ) Notice: Subject to any disclaimer, the term of this patent is extended or adjusted under 35 U.S.C. 154(b) by 207 days.

(21) Appl. No.: 18/534,238

(22) Filed: Dec. 8, 2023

(65) Prior Publication Data

US 2025/0190201 A1     Jun. 12, 2025

(51) Int. Cl.
| | |
|---|---|
| *G06F 8/65* | (2018.01) |
| *G06F 11/14* | (2026.01) |
| *G06N 20/00* | (2019.01) |

(52) U.S. Cl.
CPC ............ *G06F 8/65* (2013.01); *G06F 11/1433* (2013.01); *G06N 20/00* (2019.01)

(58) Field of Classification Search
USPC ................................. 717/168–178, 124–135
See application file for complete search history.

(56) References Cited

U.S. PATENT DOCUMENTS

| | | | | |
|---|---|---|---|---|
| 11,429,384 | B1 * | 8/2022 | Navert ...................... | G06F 8/60 |
| 11,947,946 | B1 * | 4/2024 | Rao ......................... | G06N 20/20 |
| 2007/0220510 | A1 * | 9/2007 | Bell ......................... | G06F 9/453 |
| | | | | 717/174 |
| 2017/0235561 | A1 * | 8/2017 | Butler ..................... | G06F 8/654 |
| | | | | 717/168 |
| 2019/0303118 | A1 * | 10/2019 | Avinash Dorle .... | H04L 41/5009 |
| 2020/0074476 | A1 * | 3/2020 | Ellison ................... | G06N 3/088 |
| 2021/0328888 | A1 * | 10/2021 | Rath ........................ | G06F 18/22 |
| 2022/0236973 | A1 * | 7/2022 | Sethi ...................... | G06F 11/3006 |
| 2023/0016397 | A1 * | 1/2023 | Kodimer ............ | G06Q 30/0234 |
| 2023/0111056 | A1 * | 4/2023 | Decrop ..................... | G06F 8/62 |
| | | | | 717/171 |
| 2025/0028516 | A1 * | 1/2025 | Parandehgheibi ........ | G06F 8/65 |

* cited by examiner

*Primary Examiner* — Andrew M. Lyons
(74) *Attorney, Agent, or Firm* — FINNEGAN, HENDERSON, FARABOW, GARRETT & DUNNER, LLP

(57) ABSTRACT

Systems, devices, methods, and computer readable media for determining potential issues with a software upgrade are disclosed. In one implementation, the disclosed system includes at least one processor and at least one non-transitory memory storing instructions to perform operations when executed by the at least one processor. The operations include training a machine learning model on historic trouble ticket data; receiving data relating to a planned software upgrade; providing the received data to the trained machine learning model, wherein the trained machine learning model generates a tag value; calculating a risk score based on the tag value; and determining a client-specific action to be performed relating to the planned software upgrade and based on the risk score.

24 Claims, 4 Drawing Sheets

100

300

SYSTEM AND METHOD FOR DETERMINING POTENTIAL ISSUES WITH A SOFTWARE DEPLOYMENT

FIELD OF THE DISCLOSURE

The disclosed embodiments generally relate to systems, devices, methods, and computer-readable medium for determining potential issues with a software deployment.

BACKGROUND

Current enterprise software is complex and may include hundreds or thousands of individual components. Updating one or more of those components may cause cascading problems in other components in the software and may sometimes lead to other components becoming inoperable. This situation becomes more complicated when not all deployments of the software use all possible features or components, such that the upgrade process is often specific to a given deployment (i.e., based on which features or components are active and updated in a given deployment).

Such a wide range of possible combinations of components leads to difficulties in supporting such software, including resolving "trouble tickets" for a given deployment, sometimes on the order of one thousand tickets per day.

It would be helpful to software developers and to end-user customers to be able to determine prior to a software update being deployed whether any components included in the update may cause cascading issues with other components.

SUMMARY

Embodiments of the present disclosure may include a system for determining potential issues with a software upgrade. The system includes at least one processor and at least one non-transitory memory storing instructions to perform operations when executed by the at least one processor. The operations include training a machine learning model on historic trouble ticket data; receiving data relating to a planned software upgrade; providing the received data to the trained machine learning model, wherein the trained machine learning model generates a tag value; calculating a risk score based on the tag value; and determining a client-specific action to be performed relating to the planned software upgrade and based on the risk score.

Embodiments of the present disclosure may include a computer-implemented method for determining potential issues with a software upgrade. The method includes training a machine learning model on historic trouble ticket data; receiving data relating to a planned software upgrade; providing the received data to the trained machine learning model, wherein the trained machine learning model generates a tag value; calculating a risk score based on the tag value; and determining a client-specific action to be performed relating to the planned software upgrade and based on the risk score.

Embodiments of the present disclosure may include a non-transitory computer-readable storage medium comprising instructions for determining potential issues with a software upgrade, wherein when executed by a processor perform operations. The operations include training a machine learning model on historic trouble ticket data; receiving data relating to a planned software upgrade; providing the received data to the trained machine learning model, wherein the trained machine learning model generates a tag value; calculating a risk score based on the tag value; and determining a client-specific action to be performed relating to the planned software upgrade and based on the risk score.

DETAILED DESCRIPTION

Figure 1:
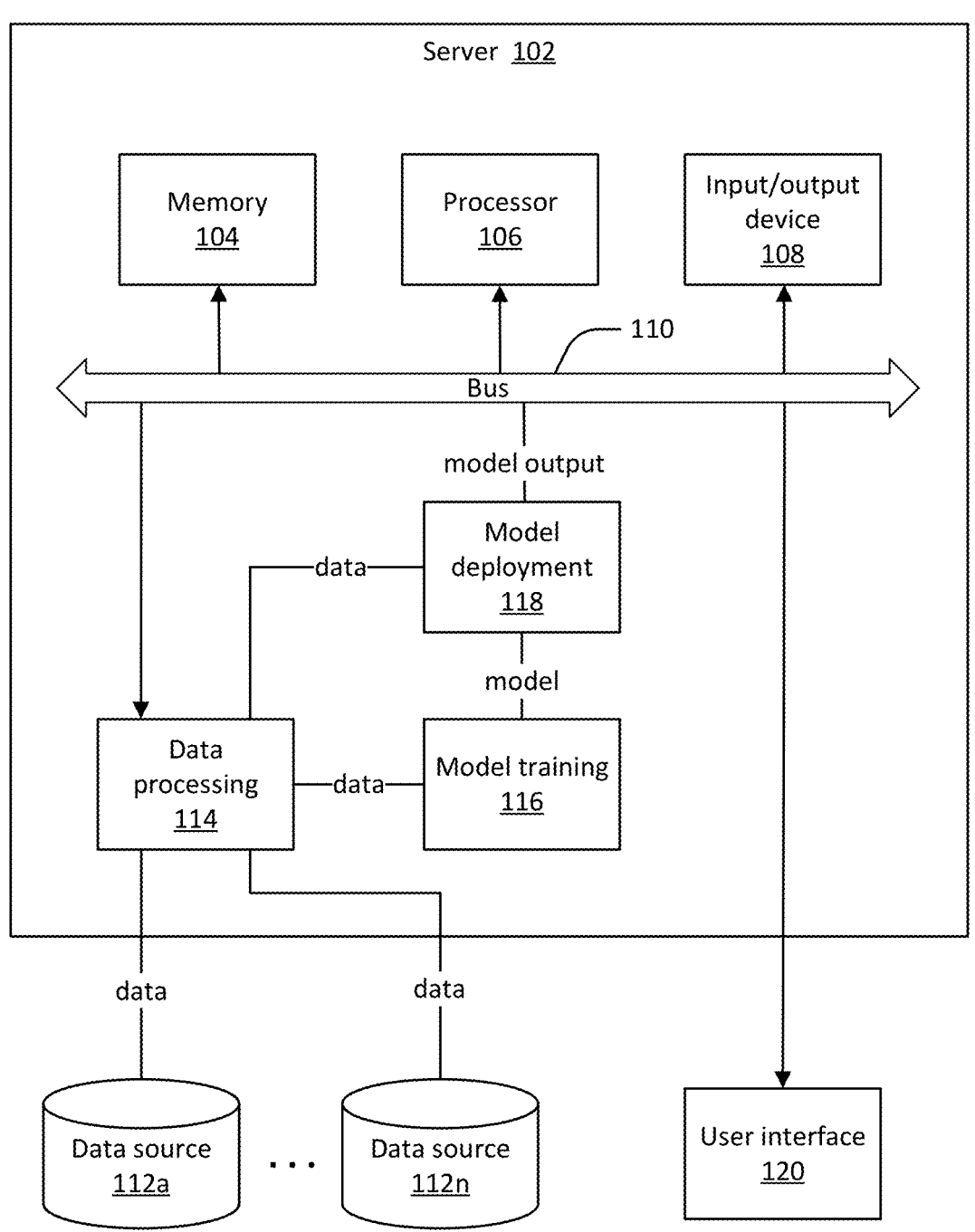
FIG. 1 is a diagram of an exemplary system for determining potential issues with a software deployment, consistent with disclosed embodiments.

It is to be understood that both the foregoing general description and the following detailed description are exemplary and explanatory only and are not restrictive of this disclosure. The accompanying drawings, which are incorporated in and constitute a part of this specification, illustrate several exemplary embodiments and together with the description, serve to outline principles of the exemplary embodiments.

This disclosure may be described in the general context of customized hardware capable of executing customized preloaded instructions such as, e.g., computer-executable instructions for performing program modules. Generally, program modules include routines, programs, objects, components, data structures, and so forth, which perform particular tasks or implement particular abstract data types. The disclosed embodiments may also be practiced in distributed computing environments where tasks are performed by remote processing devices that are linked through a communications network. In a distributed computing environment, program modules may be located in local and/or remote computer storage media including memory storage devices.

Given the extensive scale and complexity of some modern software products, across multiple lines of business, client service representatives are often challenged with properly identifying updates and/or changes to client products that potentially pose a risk to production services. Software development operations use a variety of tools during project development, including, but not limited to, a software updater, a bug tracker, a source code host, and a project management tool. In some embodiments, a software deployment refers to software including one or more components that is installed on one or more devices and is used by a client or end-user. Examples of software deployments may include financial software, data storage software, customer support software, and similar single-feature or multi-feature software products. The software development tools involved in software deployment are typically independent systems that are not easily linked together. For example, each tool may have its own structured fields used to define various data items, such as documenting a change. To obtain the details for a particular change, a developer needs to separately access each tool, which is a time-consuming task.

Manually reviewing change requests, product releases, and code deployments and linking that information to client incidents/tickets to anticipate issues in pending releases is too time intensive to be feasibly executed by a single person or team. Because of the scale of the problem (thousands of "trouble tickets"), developers may have only reviewed pending software changes for a few clients with known issues in the past and/or with particular software changes. For example, this process may include retroactively triaging client environments or instances after issues have already occurred and/or been reported by the client. In some systems, there are 20,000 to 30,000 tickets per month regarding software changes (i.e., about 1000 tickets per day). It is not feasible to manually manage this volume of information.

In some embodiments, the terms "ticket" or "trouble ticket" (or their plural forms) refer to an issue with the software deployment (e.g., a bug, a non-working feature, or a problem with a feature of the software deployment) raised by a client or developer. In some embodiments, the term "client" refers to an end-user of the software.

It is desirable to be able to automatically determine whether a software change (e.g., a change to one software component) will create one or more outages or service interruptions in other software components prior to deploying the software change for all clients, not just a select subset of clients. For example, a developer might want to know how risky it is that a particular software change will cause cascading problems (i.e., how likely it is that a particular software change will "break" other components) and be able to advise clients in advance whether there may be deployment issues.

The present disclosure describes embodiments of an artificial intelligence (AI)-based client experience optimizer for clients and products. For example, some embodiments may utilize AI to proactively anticipate defects before they occur and target risky clients or client environments identified by the model to test or partner with on new deployments (that would not have previously been targeted or identified for testing). High-risk clients may be identified based on historical service interruptions or created tickets due to system updates, releases, code deployments, or other changes to production services. As new change requests or tickets are raised by product development teams, a dual client/support team facing application prioritizes high-risk clients and alerts stakeholders ahead of software releases for partnership opportunities. For example, conducting beta testing or user acceptance testing (UAT) with those clients identified as high risk, in advance of new changes or releases. The application may also generate targeted messaging to clients/support representatives based on historical client sentiment observed in correspondence resolving historical tickets.

The application provides the ability to collect, analyze, and summarize unstructured document data from developer meta-data, project management notes, and subsequent issues/tickets to client services. This information may be used to generate risk indicators and targeted messaging to prioritize clients for beta-testing and related partnerships to anticipate service issues ahead of pending software releases. This kind of client-centered partnering and messaging is currently done manually, and often only reactively after issues have already arisen.

In some embodiments, the developer, ticketing, and tracking systems that have the details of the software deployments are combined with the software changes. The system uses a custom machine learning model, text processing, a "join up" process based on time windows, and using labels. In some embodiments, the "join up" process may be used to identify data across the different developer, ticketing, and tracking systems to find entries in all of those systems that correspond to a designated time window. By doing so, it may be possible to associate ticketing and tracking information with a time of a particular prior software update, for example. "Fuzzy logic" (i.e., approximate matches) and matching (i.e., exact matches) may be applied by the "join up" process on searches or joins across the various developer systems to consolidate the data from those systems and to identify overlapping issues for products or clients across the data sources. For example, to find matching content within a time horizon (to match up with deployment timelines). In some embodiments, an application programming interface (API) may be used for connectivity to import the data from the separate systems.

In some embodiments, combining the information from these systems creates a history of what has caused defects, incidents, or service interruptions. This information may be leveraged to help flag future tickets to identify that there might be a risk with a software change. The system uses the history of known issues to make predictions. A software update cannot move forward unless it is approved (i.e., the software update has a change date in the future). The system enables developers to determine whether an upcoming change looks similar to a change that caused past issues.

Before the change is deployed (i.e., "goes live"), the system may create an internal alert to the developer. The developer may then use this information to determine how to best approach the client regarding the upcoming software update. Depending on the client sentiment (based on how this client reacted to prior software updates), it may change how the software change is pitched, presented, and/or deployed to the client. In some embodiments, the client sentiment may be determined based on a sentiment analysis (e.g., determining an emotional tone) of prior client comments, emails, or other correspondence relating to resolving historical issues. In some embodiments, the system may apply a customized ensemble of sentiment models to generate the final sentiment score and a targeted response to the client. A first layer of the model runs historical documents (for example, client emails and ticket requests) through a pre-trained sentiment analyzer, and filters only those documents with strong positive or negative overall scores (for example, the absolute value of the score is greater than 0.75). For any documents with non-neutral scores, but not significantly positive or negative, a more sophisticated pre-trained Large Language Model (for example, Llama-2, Falcon, GPT3, or other model) processes the documents and generative AI may be utilized to create a targeted message to those clients.

When a planned change is coming, the trained machine learning model may be used to identify clients that encountered numerous bugs/defects in the past. The developer can easily find key contact points and create a targeted messaging component to help prepare the client for the upcoming software change. This information may also include sentiment information (i.e., how well were past changes/issues received, resolved, etc.) and may enable the developer to determine whether a particular client might need additional support.

In some embodiments, the system may be run once per day. For example, if the system is run overnight, the output includes a batch of changes (for the next day) that have been flagged as needing attention (for example, identifying a partner client for software testing).

FIG. 1 is a diagram of an exemplary system 100 for determining potential issues with a software deployment, consistent with disclosed embodiments. The system 100 incudes a server 102 having a memory 104, a processor 106, and an input/output device 108 communicating with each other via a bus 110. In some embodiments, the system 100 may include one or more servers 102, memories 104, processors 106, input/output devices 108, and/or buses 110. It is noted that the server 102 may be embodied in any computing device and need not be limited to a server. The memory 104 may include any type of memory device, including, but not limited to a read-only memory (ROM), a random access memory (RAM), a long-term storage medium (e.g., a hard drive), or other memory type, configured to store computer program instructions and data. The processor 106 may include any type of processor, including, but not limited to a central processing unit (CPU) having one or more processing cores, a graphics processing unit (GPU), a digital signal processor (DSP), a field programmable gate array (FPGA), or other electronic circuitry configured to execute instructions. The input/output device 108 may include one or more devices to enable a user of the server 102 to provide input to the server 102 and receive output from the server 102. Such devices may include, but are not limited to, a keyboard or other text input device, a mouse or other cursor control device, a display (e.g., a screen or a monitor), an audio device, or a communications device (e.g., a modem or a similar device that provides wired or wireless connectivity to external sources, for example, the Internet). The bus 110 may include any type of electronic interconnect that permits electronic signals to be exchanged between the memory 104, the processor 106, and the input/output device 108.

One or more data sources 112*a*-112*n* include data such as software update information, bug tracking information, source code information, and project management information, as described elsewhere in this disclosure. In some embodiments, the data sources 112*a*-112*n* may be stored in databases or storage systems external to the server 102 and may transfer data to the server 102 via a wired or wireless connection. The data may be communicated to elements of the server 102 via the bus 110. The data sources 112*a*-112*n* provide data to a data processing component 114.

The data processing component 114 performs operations on the data to provide data to a machine learning model training component 116 and to a machine learning model deployment component 118. In some embodiments, the data processing component 114 joins post-processed text data from data sources 112*a*-112*n*. Key topics are identified by summarizing and/or extracting keywords from the post-processed text data and joined to project management tickets (e.g., from project management tool 112*d*) within close proximity following the release dates (e.g., from the software updater 112*a*) that also contain those key topics. The data processing component 114 may perform operations such as extraction, transformation, and loading, to coalesce the data from the data sources 112*a*-112*n* into a single format to be usable by the machine learning model training component 116 and the machine learning model deployment component 118. The data processing component 114 may also communicate with the other components of the server 102 over the bus 110. In some embodiments, the data processing component 114 may be a software component executed by the processor 106. In other embodiments, the data processing component 114 may be a hardware component (e.g., a dedicated processor or other integrated circuit) that may communicate with other elements of the server 102 via the bus 110.

The machine learning model training component 116 may be trained on historic trouble ticket data, including issues raised, how those issues were resolved, and client sentiment regarding those issues and their resolution. In some embodiments, the machine learning model training component 116 may be trained to learn an association between a prior software modification and any previous incidents (e.g., trouble tickets) related to the prior software modification.

In some embodiments, the machine learning model training component 116 may be a software component executed by the processor 106. In other embodiments, the machine learning model training component 116 may be a hardware component (e.g., a dedicated processor or other integrated circuit) that may communicate with other elements of the server 102 via the bus 110. The machine learning model training component 116 provides a trained machine learning model to the machine learning model deployment component 118. The machine learning model deployment component 118 takes current data about a proposed software upgrade or change as input and provides a model output, which is displayed to a user via a user interface 120 in communication with the input/output device 108. In some embodiments, a software upgrade may include a change to one or more components of a software deployment. For example, a software upgrade may include a "bug fix" (i.e., a change to correct a previous error), a feature upgrade (i.e., adding one or more new features to the software), or other similar software change. In some embodiments, the machine learning model deployment component 118 may be a software component executed by the processor 106. In other embodiments, the machine learning model deployment component 118 may be a hardware component (e.g., a dedicated processor or other integrated circuit) that may communicate with other elements of the server 102 via the bus 110.

In some embodiments, the predictions (outputs) of the trained machine learning model are used to identify which clients to target for partnership and testing opportunities. When the trained machine learning model triggers a sufficiently high risk score on a new deployment, any available client (e.g., software updater) is joined to the data, but is first run through the sentiment analyzer as described above. For clients that do not have highly polarized sentiment scores, the release (deployment) details, defect history, and client history are fed into a large language model (LLM), which generates the targeted messaging to clients about partnering or testing new releases. For clients that do have highly polarized scores, an alert may be triggered to a client support team to tailor messaging to the client based on strong positive relationships in the past, or to determine if the relationship has been too strained to partner at all for strong negative relationships.

In some embodiments, the user interface 120 may be presented on a display (e.g., a monitor or other display device) connected to the server 102. In other embodiments, the user interface 120 may be presented on a display that is located remote from the server 102 (e.g., via a device connected to the server 102 by a wired or wireless connection). In some embodiments, the model output may include a risk score relating to a likelihood of an issue arising based on the software update or an action plan for contacting a client regarding the proposed software update. In some embodiments, the "action plan" may include one or more steps to be performed to communicate with an identified client (e.g., as identified by the risk score) to determine how to present the proposed software update to the client. In some embodiments, the action plan may include suggestions for communicating with the client based on historical communications with the client, a testing plan for the software update to be presented to the client, or similar client-focused communications. In some embodiments, the action plan may be an invitation or an alert to the client to partner on a pending release, which may be entirely machine generated (e.g., by a LLM as described above) or may be determined at the discretion of a client support individual.

Figure 2:
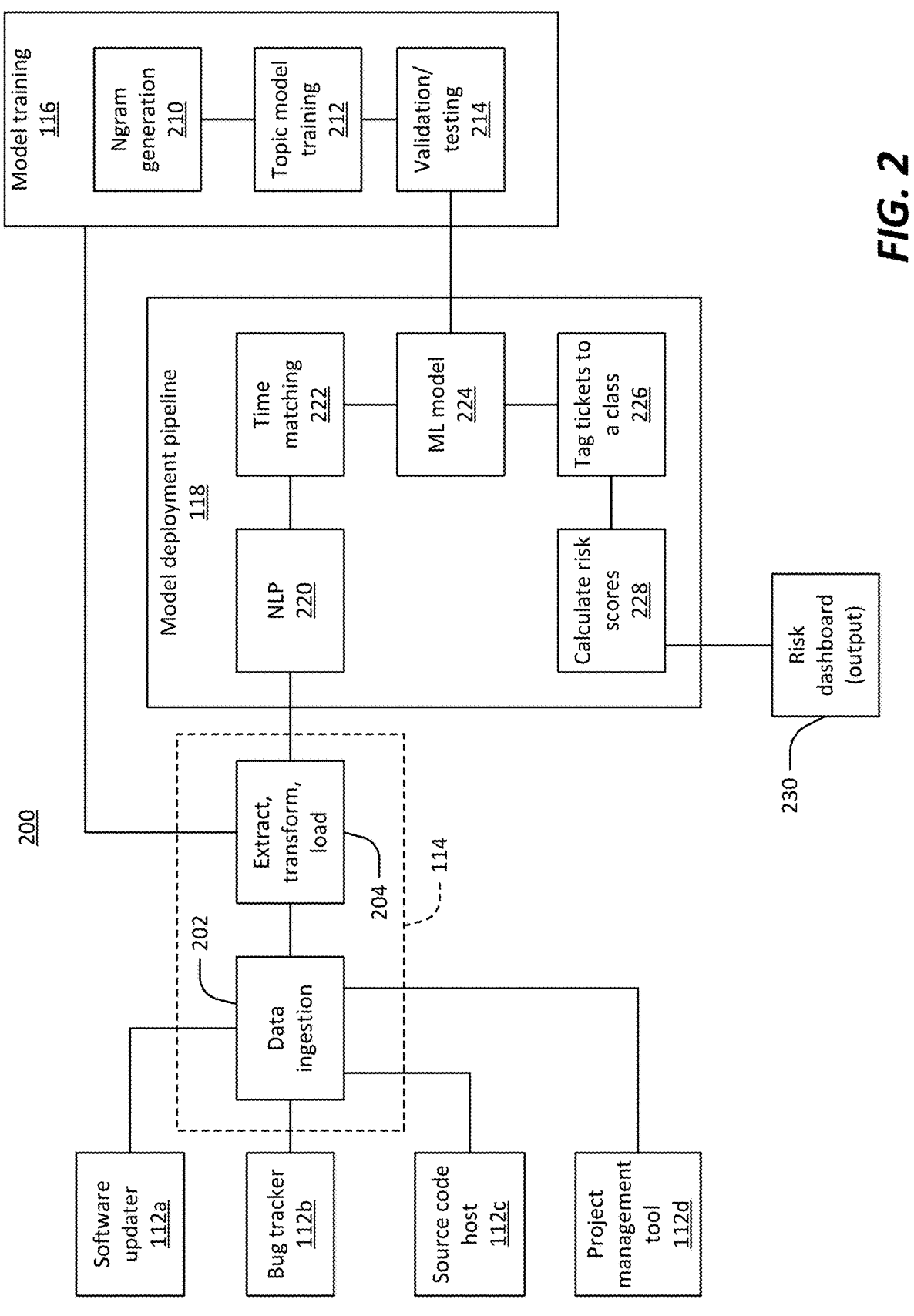
FIG. 2 is a diagram of another exemplary system for determining potential issues with a software deployment, consistent with disclosed embodiments.

FIG. 2 is a diagram of an exemplary system 200 for determining potential issues with a software deployment, consistent with disclosed embodiments. In some embodiments, the system 200 may be constructed in a similar manner as the system 100. For example, the system 200 may be viewed as a specific implementation of the system 100; for purposes of explanation, not all components of the system 100 are shown in FIG. 2. The system 200 includes several data sources 112, such as a software updater 112a, a bug tracker 112b, a source code host 112c, and a project management tool 112d.

The software updater 112a may provide data relating to information technology (IT) management workflows, including data relating to supporting IT updates and software updates. For example, the software updater 112a may include tools such as ServiceNow® or TeamSupport. For example, software updater data may include the ticket management data relating to client services and delivery, such as client service cases, escalations, queries, incidents, problems, and similar data, which may be generated by client inquiries and emails.

The bug tracker 112b may provide data relating to bug tracking and project tracking. For example, the bug tracker 112b may include tools such as Jira.

The source code host 112c may be a source code repository and may provide data relating to code history and collaboration information. For example, the source code host 112c may include tools such as BitBucket. For example, source code host data may include a code repository where metadata is scraped and may include data such as a number of project files, script names, type, language, and similar data.

The project management tool 112d may provide data relating to collaborative work tracking and project management. For example, the project management tool 112d may include tools such as Rally®. For example, project management tool data may include user stories, backlog, developer epics, release/defect notes, and similar data surrounding each release.

The data sources 112a-112d provide various types of data relating to software updates, trouble tickets, and the resolutions of those trouble tickets. The data from the data sources 112a-112d is a combination of structured data (e.g., fixed categorical values in structured rows/columns of a matrix) and unstructured data (e.g., free-form text). All of the data sources are joined and stored for further processing.

The data sources 112a-112d provide data to the data processing component 114. The data processing component 114 includes a data ingestion component 202 and an extract, transform, and load (ETL) component 204. The data ingestion component 202 and the ETL component 204 may be implemented as software components in the data processing component 114 and performed by processor 106 or may be implemented as one or more integrated circuits in the data processing component 114.

The data ingestion component 202 connects data from the different data sources together, for example, based on a common trouble ticket, a common software update, or a common date range. For example, the data ingestion component 202 may connect trouble tickets from the bug tracker 112b that were created within a particular date/time range that corresponds to a particular prior software update (based on data from the software updater 112a, the source code host 112c, and/or the project management tool 112d). This is done to associate the trouble tickets with the corresponding software update that caused the ticket to be generated.

In some embodiments, the data from the different data sources (e.g., data sources 112a-112d) is fed into a single storage location (e.g., an Amazon Web Services™ S3 bucket) and joined based on multiple fields. Dates of releases and defects from the bug tracker 112b and the project management tool 112d, along with key topics extracted from those project details are used to join tickets from clients (e.g., from software updater 112a) on the same "impacted services" as those releases. Every ticket in the software updated 112a has a "Configuration Item" (CI) which may be granular, and needs to be "rolled up" to a product or platform using relationships in a "Configuration Management Database" (CMDB). Client tickets that come in on particular CIs are mapped to their parent service offering, product, or platform and topics are extracted. If that ticket is on a service, product, or platform that had a recent deployment (e.g., within 10 days prior to the ticket), and contains at least two of the key topics identified by that release (or overlapping with "known defects" that have occurred in similar releases), the tickets and corresponding data are fed into the same LLM that is used to determine sentiment. Those LLMs are robust enough to determine whether the issues described by the client are sufficiently similar to historical "known defects" or could be impacted by the services changed in the release. If the LLM determines that the client issue is impacted by the deployment identified, the records are joined. This may be referred to as a "fuzzy" join.

The data ingestion component 202 provides the connected data to the ETL component 204. The ETL component 204 may reformat the data into a single format to be used by the machine learning model. For example, in some embodiments, the data may be saved as Python® dictionaries (JavaScript Object Notation (JSON) objects) in S3 buckets on Amazon Web Services™. Because the data obtained from the data sources 112a-112d may be in different formats in each source, it is more efficient to process the data and to reformat it into a single format for use by the machine learning model. The ETL component 204 may apply one or more rules or templates to reformat the data into a single format. In some embodiments, the functionality of the data ingestion component 202 and the ETL component 204 may be combined into a single component.

After the data from the data sources 112a-112d has been processed by the data ingestion component 202 and the ETL component 204, the processed data is provided to the model training component 116 and the model deployment pipeline 118. The model training component 116 trains a machine learning model based on historic data from the data sources 112a-112d. The model deployment pipeline 118 applies the trained machine learning model to proposed software updates (based on data derived from the software updated 112a, the source code host 112c, and the project management tool 112d) to assign a risk score to each proposed software update.

The model training component 116 includes an Ngram generation component 210, a topic model training component 212, and a validation/testing component 214. The Ngram generation component 210 generates Ngrams from the processed data, which is a sequence of N words and are used in natural language processing. The Ngram generation component 210 forwards the Ngrams to the topic model training component 212. The topic model training component 212 processes the Ngrams, detects word and phrase patterns within the Ngrams (for example, by using an LLM), and creates word group clusters based on the patterns. In some embodiments, the topic model training component 212 may be a semi-unsupervised machine learning model. The validation/testing component 214 receives the word group clusters from the topic model training component 212 and creates a machine learning model that is provided to the model deployment pipeline 118 to analyze data relating to proposed software updates.

The model deployment pipeline 118 includes a natural language processing (NLP) component 220, a time matching component 222, a machine learning (ML) model component 224, a tagging component 226, and a risk score calculator 228. The NLP component 220 processes received data relating to a proposed software update to determine word group clusters. In some embodiments, preliminary topic modeling may be performed to determine the candidate records to feed into the LLM that joins the data. Preliminary Topic extraction of 1-grams, 2-grams, and 3-grams may be executed with, for example, BERT (Bidirectional Encoder Representations from Transformers)-Topic modeling. Other Ngram generators may also be used. The word group clusters are passed to the time matching component 222 which uses date/time related information in the received data to group together trouble ticket information and software update information that appear close together in time. For example, the information is grouped to determine which trouble tickets were created in response to a particular software update. In such circumstances, the trouble tickets would have a creation date close in time to the time when the software update was deployed.

The time-based grouped together word group clusters are provided to the ML model 224, which was trained on historic trouble ticket data as described elsewhere in this disclosure. The ML model 224 determines a tag value to associate with each trouble ticket. The tag values are passed to the tagging component 226 which assigns each trouble ticket to a class based on the associated tag value. This information is passed to the risk score calculator 228 which calculates a risk score for each trouble ticket based on the information in the trouble ticket and its associated tag. The calculated risk scores are output to a user via a risk dashboard 230.

Figure 3A:
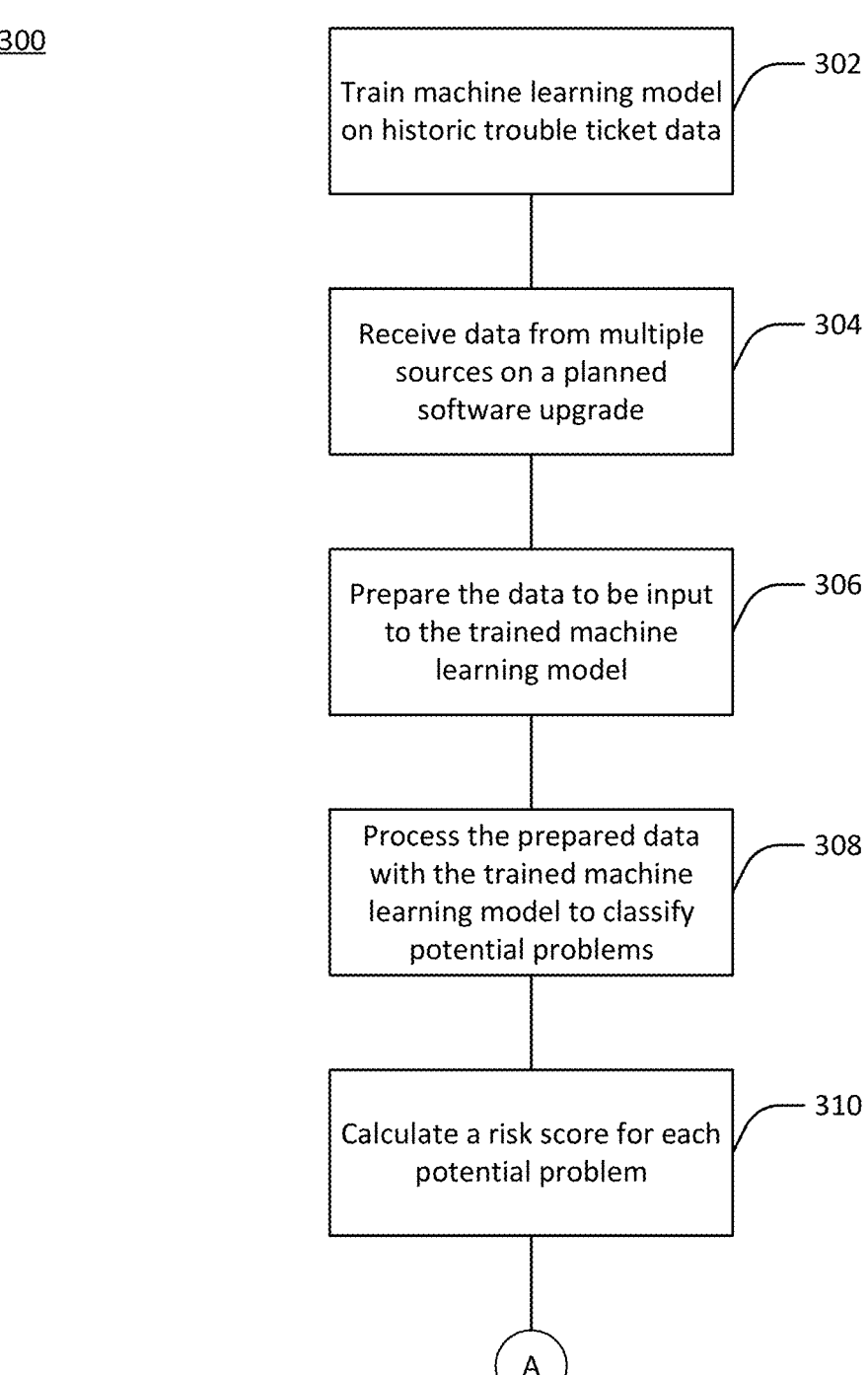
FIGS. 3A and 3B are a flowchart of a method for determining potential issues with a software deployment, consistent with disclosed embodiments.
Figure 3B:
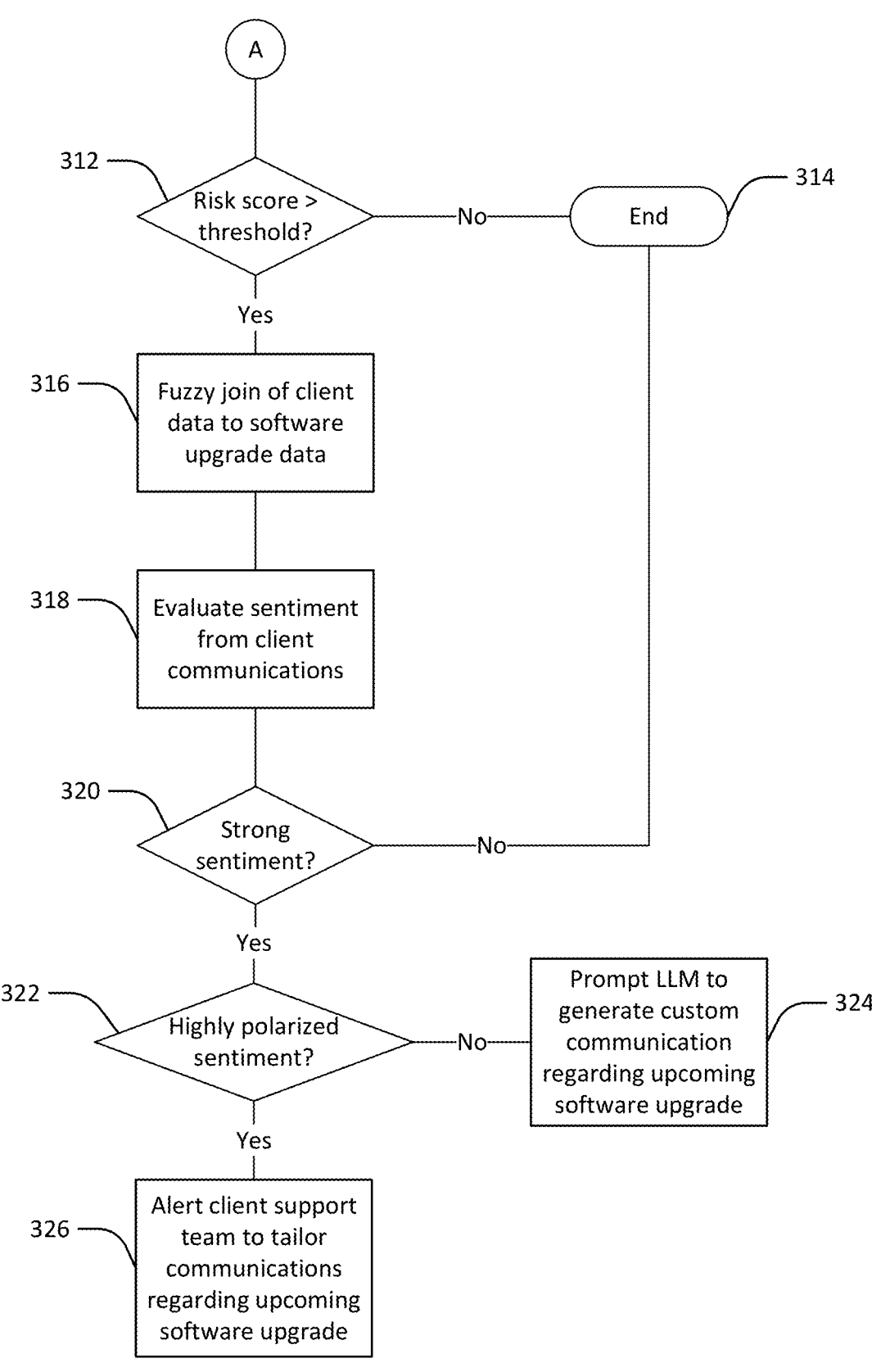

FIGS. 3A and 3B are a flowchart of a method 300 for determining potential issues with a software deployment, consistent with disclosed embodiments. In some embodiments, the method 300 may be performed by the system 100 or the system 200 described above.

Starting in FIG. 3A, a system (e.g., system 100) trains a machine learning model using historic trouble ticket data (step 302). In some embodiments, the historic trouble ticket data may be derived from various data sources, such as a software updater, a bug tracker, a source code host, and a project management tool as described elsewhere in this disclosure.

The system receives data from multiple sources relating to a proposed software upgrade (step 304). Similar to the historic data, in some embodiments, the data relating to the proposed software upgrade may be received from a software updater, a bug tracker, a source code host, or a project management tool.

The system may prepare the received data to be input into the trained machine learning model (step 306). As described elsewhere in this disclosure, this data preparation may be performed by the data processing component 114, the data ingestion component 202, the ETL component 204, the NLP component 220, and/or the time matching component 222.

The system may input the prepared data into the trained machine learning model for processing; the model may classify potential problems associated with the proposed software upgrade (step 308).

The classification may include assigning a tag to each potential problem, wherein each tag is associated with a particular class of potential problems. The system may then calculate at least one risk score for each potential problem (for example, by risk score calculator 228 (step 310).

Moving to FIG. 3B, the system may make a determination whether the calculated risk score is greater than a threshold (step 312). If the calculated risk score is not greater than the threshold (step 312, "no" branch), then the method 300 terminates (step 314).

If the calculated risk score is greater than the threshold (step 312, "yes" branch), then the system may perform a fuzzy join of client data to software upgrade data (step 316). In some embodiments, pre-trained topic models may be used to summarize the client data (i.e., a "fuzzy" join as described above) and a first LLM may be used to validate this fuzzy join.

The system may evaluate sentiment from previous client communications (step 318). For example, a sentiment score based on the previous client communications may be determined. In some embodiments, the sentiment score may be determined utilizing a combination of pre-trained machine learning models, for example, models such as Vader and TextBlob. Both of these models generate a score for a block of provided text, between −1 and +1. Negative scores relate to negative sentiment, while positive scores relate to positive sentiment. In practice, the maximum of the absolute value of the scores from the two models may be taken as a preliminary sentiment score, so that if either model shows a significant sentiment in the positive direction or the negative direction, the associated ticket may be sent to a second LLM for validation.

Both the first LLM and the second LLM described above may be used to filter records that do not go together or include language expressing a sentiment. The first LLM and the second LLM may be used to validate the fuzzy join and the client sentiment, respectively, to handle false positives generated by simpler, less accurate models. By using the first LLM and the second LLM as filters, the high computational overhead of repeatedly calling the LLMs for every fuzzy join and every client sentiment analysis may be avoided.

The system may evaluate the sentiment score to determine whether the sentiment score indicates a strong sentiment (step 320). For example, the sentiment score may be compared to a second threshold. If the sentiment score does not indicate a strong sentiment (step 320, "no" branch), then the method 300 terminates (step 314).

If the system determines that the sentiment score indicates a strong sentiment (step 320, "yes" branch), then the system may evaluate the sentiment score a second time to determine whether the sentiment score indicates a highly polarized client sentiment, either in a positive direction or in a negative direction (step 322). For example, a highly polarized score may be determined by comparing the sentiment score to a third threshold (for a positive sentiment) or a fourth threshold (for a negative sentiment).

If the sentiment score does not indicate a highly polarized sentiment (step 322, "no" branch), then the system may prompt a third LLM to generate a custom communication to the client regarding the upcoming software upgrade (step 324). For example, the third LLM may generate communications regarding a partnership opportunity with the client such as beta testing for an upcoming software change or release or prompting the client to contact the developer's client relations team to delay implementing the deployment.

Prompts to LLMs may be long, as they have to provide sufficient context to the model to "understand" what is being asked of the client. In particular, the following is a typical example of what may be submitted as a prompt to the third LLM, where square brackets [ ] identify particular variables or text that would be loaded into the prompt:

[product/platform name] is a [product/service/application] for Company. Here is some background on that [product/service/application]:

[insert any internal/external Wiki's on the product available, Knowledge Base (KB) articles/summaries of KB articles, etc.]

A [change/new release/new code deployment] is pending for [product/platform name], for a client that a previous Large Language Model has identified as having [positive/negative] sentiment in their dealings with similar updates to this [product/service/application] in the past. In particular, that LLM found:

[validation output from the second LLM]

It determined that sentiment from the following ticket [ticket type] text:

[insert raw tickets or summaries of raw tickets]

Here are the [change/release/code deployment] details pending for this [product/service/application]:

[insert change request ticket or summary for new releases/code deployments]

Company is committed to maintaining strong, positive relationships with its customers. Given this background, we would like to [alert/partner with] this client prior to the update/release to [anticipate concerns/get in touch with client support proactively/beta test prior to release]. Please write a short, targeted message to this client, offering a [client support individual/beta test opportunity] on the pending release, that is sensitive to their feedback noted in the tickets above.

If the sentiment score indicates a highly polarized sentiment (step 322, "yes" branch), then the system may send an alert to a client support team to tailor one or more communications to the client regarding the upcoming software upgrade (step 326). The alert may be in the form of an electronic mail message, a direct electronic message in an application, a text message, an automated voice message, or similar automatically generated electronic message. For example, a highly polarized sentiment score may indicate either a very good client relationship or a very poor client relationship. In either circumstance, alerting the developer's client support team is beneficial to the developer to help ensure a smoother software upgrade experience for the client.

The system may use the risk scores to provide an output indicating whether clients (i.e., end users of the software) need to be contacted prior to deploying a software upgrade. For example, the risk scores may indicate that there is a high likelihood that there will be a problem with a specific client when the software upgrade is deployed to that client. The software developer may wish to contact that client in advance of the planned software upgrade to request the client's help in testing the software upgrade, to advise the client that there may be problems associated with the software upgrade, or similar client relationship-related measures that may be taken by the developer to help ensure a smooth software upgrade process.

In some embodiments, the risk score may help to identify what the potential problems may be. For example, a high risk score for a particular trouble ticket may indicate that there may be a high likelihood that deploying the software upgrade will cause component "X" to not function properly. In such circumstances, the developer may be able to provide the client with more targeted advice and/or testing.

The solution described in this disclosure provides (a) an early warning system of production risks to clients and client service personnel based on analyses of historical development, change, and ticket data/documents; (b) alerts or notifications of partnership opportunities (e.g., beta-testing or user acceptance testing (UAT)) to those stakeholders identified as high risk, in advance of new changes/releases; and (c) targeted messaging as clients and client service individuals receive alerts or notifications that are sensitive to client needs and customized to their sentiments towards a company's products.

For clients, the system provides an early warning of potential issues or risks to production platforms and mitigation of those risks with beta-testing, UAT, incremental rollouts/releases, and customized, targeted support and partnerships across all lines of business, resulting in fewer service interruptions and a more optimized client experience.

For developers, the system may lead to fewer tickets/issues following release cycles and product updates that can strain client relationships and impact the company's reputational risks and client-centric credibility. The developers may also realize cost savings with fewer high-impact, high-priority tickets to resolve due to avoidable service interruptions/client outages from new deployments.

It will be apparent to those skilled in the art that various modifications and variations can be made for the integration of a software component into a software framework, the software framework, or the orchestration and integration of data, as executed by at least one processor. While illustrative embodiments have been described herein, the scope of the present disclosure includes any and all embodiments having equivalent elements, modifications, omissions, combinations (e.g., of aspects across various embodiments), adaptations, and/or alterations as would be appreciated by those skilled in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the present disclosure. It is intended, therefore, that the specification and examples be considered as exemplary only, with a true scope of the present disclosure being indicated by the following claims and their full scope of equivalents.

What is claimed is:

1. A system for determining potential issues with a software upgrade, comprising:

at least one processor; and at least one non-transitory memory storing instructions to perform operations when executed by the at least one processor including:

training a machine learning model on historic trouble ticket data, wherein the historic trouble ticket data includes issues raised in connection with a prior software upgrade, how the raised issues were resolved, and client sentiment regarding the issues raised and their resolution;

receiving data relating to a planned software upgrade;

providing the received data to the trained machine learning model, wherein:

the trained machine learning model generates a tag value;

the tag value is associated with a trouble ticket; and the tag value is used to assign the trouble ticket to a class of potential client impact categories based on historical trouble ticket patterns;

calculating a risk score for the trouble ticket based on information in the trouble ticket and the associated tag value, wherein calculating the risk score includes:

determining a likelihood that the planned software upgrade will cause client-reported problems based on similarity to historical software upgrade patterns; and correlating the planned software upgrade with historical client-reported issues; and determining an action plan to be performed relating to the planned software upgrade and based on the risk score, wherein the action plan includes generating client-specific communications based on historical client sentiment analysis derived from historical trouble ticket resolutions.

2. The system of claim 1, wherein the historic trouble ticket data includes software update data, bug tracking data, source code host data, and project management data.

3. The system of claim 1, wherein the received data includes software update data, source code host data, and project management data.

4. The system of claim 1, wherein providing the received data to the trained machine learning model includes performing one or more of: data ingestion; extraction, transformation, and loading; natural language processing; and time matching.

5. The system of claim 4, wherein performing time matching includes matching a time of an historic software upgrade with a time of bug tracking data and a time of project management data.

6. The system of claim 1, wherein the instructions further include:

classifying potential issues with the planned software upgrade based on the tag value.

7. The system of claim 6, wherein the risk score is based on a classification and the tag value.

8. The system of claim 1, wherein the instructions further include:

comparing the risk score to a first threshold; and on a condition that the risk score exceeds the first threshold, determining the action plan to be performed relating to the planned software upgrade and based on the risk score.

9. The system of claim 8, wherein the instructions further include:

calculating a sentiment score based on prior client communications;

on a condition that the sentiment score exceeds a second threshold and is less than a third threshold, generating a client communication by a trained second machine learning model regarding the planned software upgrade; and on a condition that the sentiment score exceeds the second threshold and the third threshold, generating and sending an alert to a client support team to contact the client.

10. The system of claim 1, wherein the action plan is generated by a second machine learning model, the second machine learning model having been trained on historical communications with the client.

11. A computer-implemented method for determining potential issues with a software upgrade, comprising:

training a machine learning model on historic trouble ticket data, wherein the historic trouble ticket data includes issues raised in connection with a prior software upgrade, how the raised issues were resolved, and client sentiment regarding the issues raised and their resolution;

receiving data relating to a planned software upgrade;

providing the received data to the trained machine learning model, wherein:

the trained machine learning model generates a tag value;

the tag value is associated with a trouble ticket; and the tag value is used to assign the trouble ticket to a class of potential client impact categories based on historical trouble ticket patterns;

calculating a risk score for the trouble ticket based on information in the trouble ticket and the associated tag value, wherein calculating the risk score includes:

determining a likelihood that the planned software upgrade will cause client-reported problems based on similarity to historical software upgrade patterns; and correlating the planned software upgrade with historical client-reported issues; and determining an action plan to be performed relating to the planned software upgrade and based on the risk score, wherein the action plan includes generating client-specific communications based on historical client sentiment analysis derived from historical trouble ticket resolutions.

12. The method of claim 11, wherein the historic trouble ticket data includes software update data, bug tracking data, source code host data, and project management data.

13. The method of claim 11, wherein the received data includes software update data, source code host data, and project management data.

14. The method of claim 11, wherein providing the received data to the trained machine learning model includes performing one or more of: data ingestion; extraction, transformation, and loading; natural language processing; and time matching.

15. The method of claim 14, wherein performing time matching includes matching a time of an historic software upgrade with a time of bug tracking data and a time of project management data.

16. The method of claim 11, further comprising:

classifying potential issues with the planned software upgrade based on the tag value.

17. The method of claim 16, wherein the risk score is based on a classification and the tag value.

18. The method of claim 11, further comprising:

comparing the risk score to a first threshold; and on a condition that the risk score exceeds the first threshold, determining the action plan to be performed relating to the planned software upgrade and based on the risk score.

19. The method of claim 18, further comprising:

calculating a sentiment score based on prior client communications;

on a condition that the sentiment score exceeds a second threshold and is less than a third threshold, generating a client communication by a trained second machine learning model regarding the planned software upgrade; and on a condition that the sentiment score exceeds the second threshold and the third threshold, generating and sending an alert to a client support team to contact the client.

20. A non-transitory computer-readable storage medium comprising instructions for determining potential issues with a software upgrade, wherein when executed by a processor perform operations comprising:

training a machine learning model on historic trouble ticket data, wherein the historic trouble ticket data includes issues raised in connection with a prior software upgrade, how the raised issues were resolved, and client sentiment regarding the issues raised and their resolution;

receiving data relating to a planned software upgrade;

providing the received data to the trained machine learning model, wherein:

the trained machine learning model generates a tag value;

the tag value is associated with a trouble ticket; and the tag value is used to assign the trouble ticket to a class of potential client impact categories based on historical trouble ticket patterns;

calculating a risk score for the trouble ticket based on information in the trouble ticket and the associated tag value, wherein calculating the risk score includes:

determining a likelihood that the planned software upgrade will cause client-reported problems based on similarity to historical software upgrade patterns; and correlating the planned software upgrade with historical client-reported issues; and determining an action plan to be performed relating to the planned software upgrade and based on the risk score, wherein the action plan includes generating client-specific communications based on historical client sentiment analysis derived from historical trouble ticket resolutions.

21. The non-transitory computer-readable storage medium of claim 20, wherein providing the received data to the trained machine learning model includes performing one or more of: data ingestion; extraction, transformation, and loading;

natural language processing; and time matching.

22. The non-transitory computer-readable storage medium of claim 21, wherein performing time matching includes matching a time of an historic software upgrade with a time of bug tracking data and a time of project management data.

23. The non-transitory computer-readable storage medium of claim 20, wherein the operations further comprise:

comparing the risk score to a first threshold; and on a condition that the risk score exceeds the first threshold, determining the action plan to be performed relating to the planned software upgrade and based on the risk score.

24. The non-transitory computer-readable storage medium of claim 23, wherein the operations further comprise:

calculating a sentiment score based on prior client communications;

on a condition that the sentiment score exceeds a second threshold and is less than a third threshold, generating a client communication by a trained second machine learning model regarding the planned software upgrade; and on a condition that the sentiment score exceeds the second threshold and the third threshold, generating and sending an alert to a client support team to contact the client.

* * * * *